5 Sheets—Sheet 3.
H. AITKEN.
Process for Manufacturing Illuminating-Gas.
No. 197,712. Patented Dec. 4, 1877.
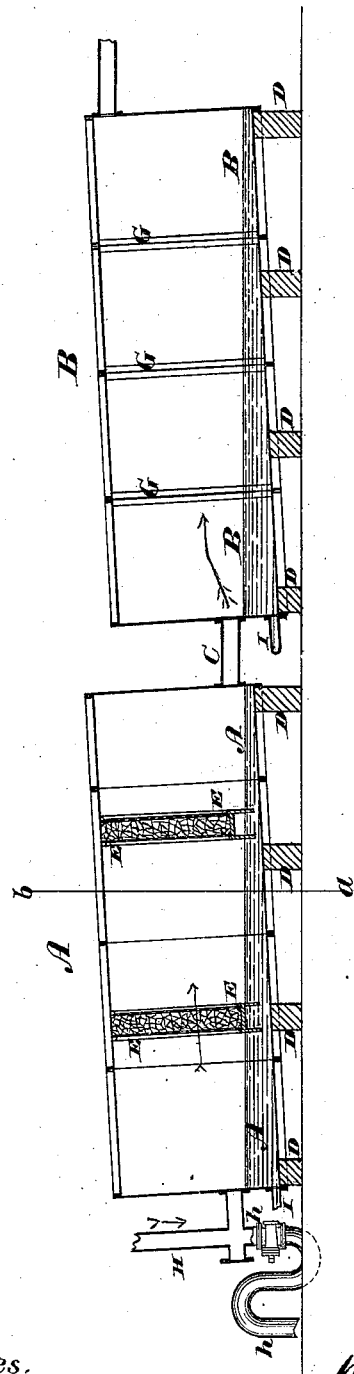
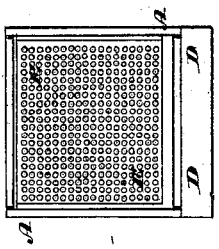
Witnesses.
Inventor.
Henry Aitken.

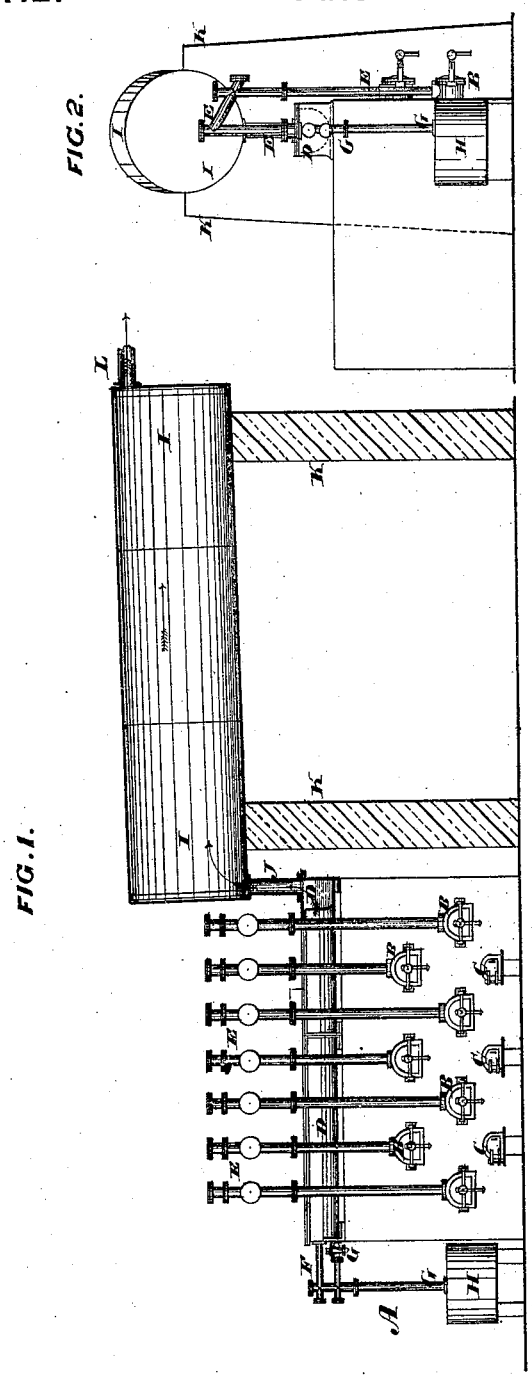

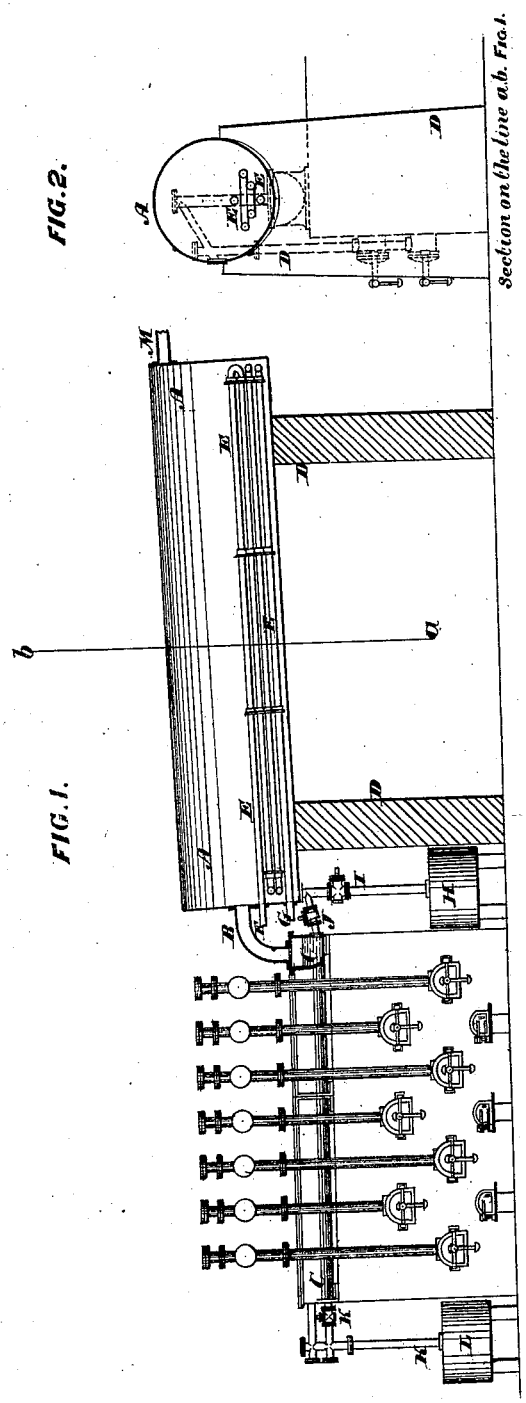

H. AITKEN.
Process for Manufacturing Illuminating-Gas.
No. 197,712. Patented Dec. 4, 1877.
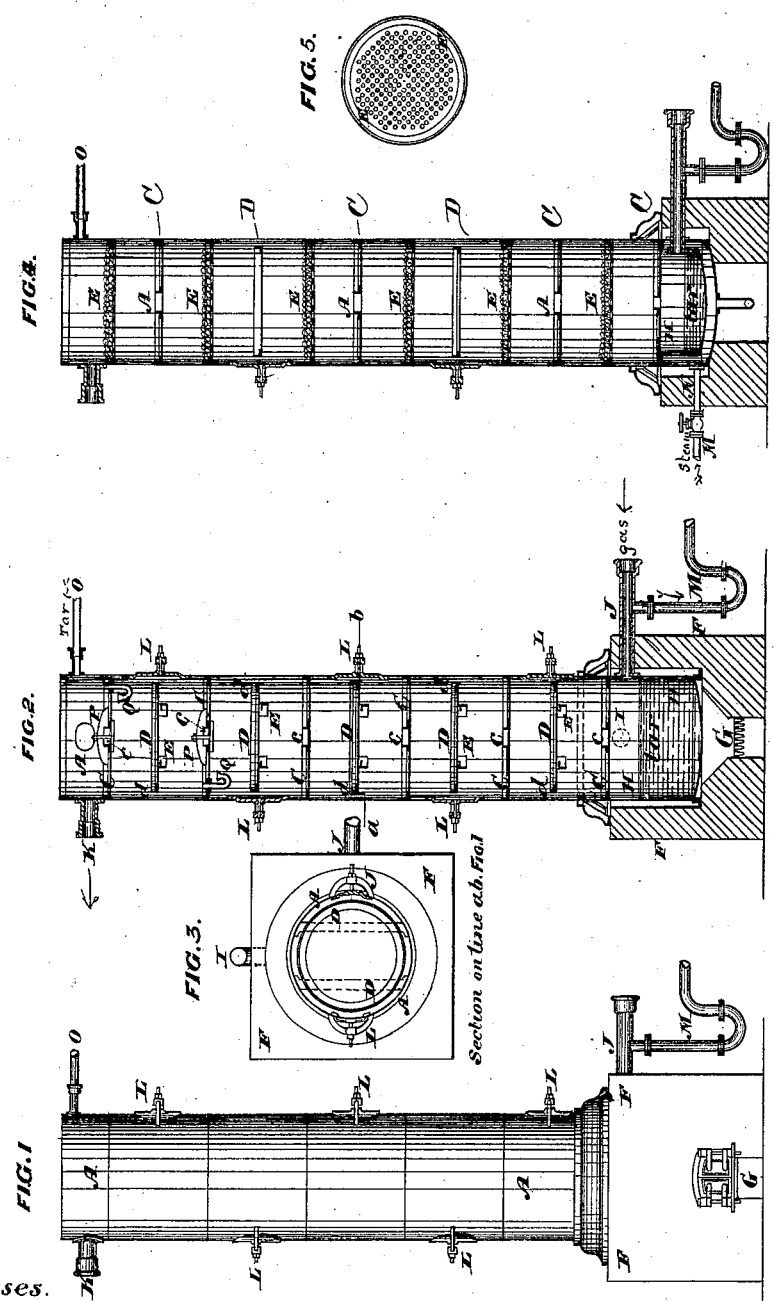
Witnesses.
David Drysdale Austen
George Macaulay Cruikshank
Inventor.
Henry Aitken

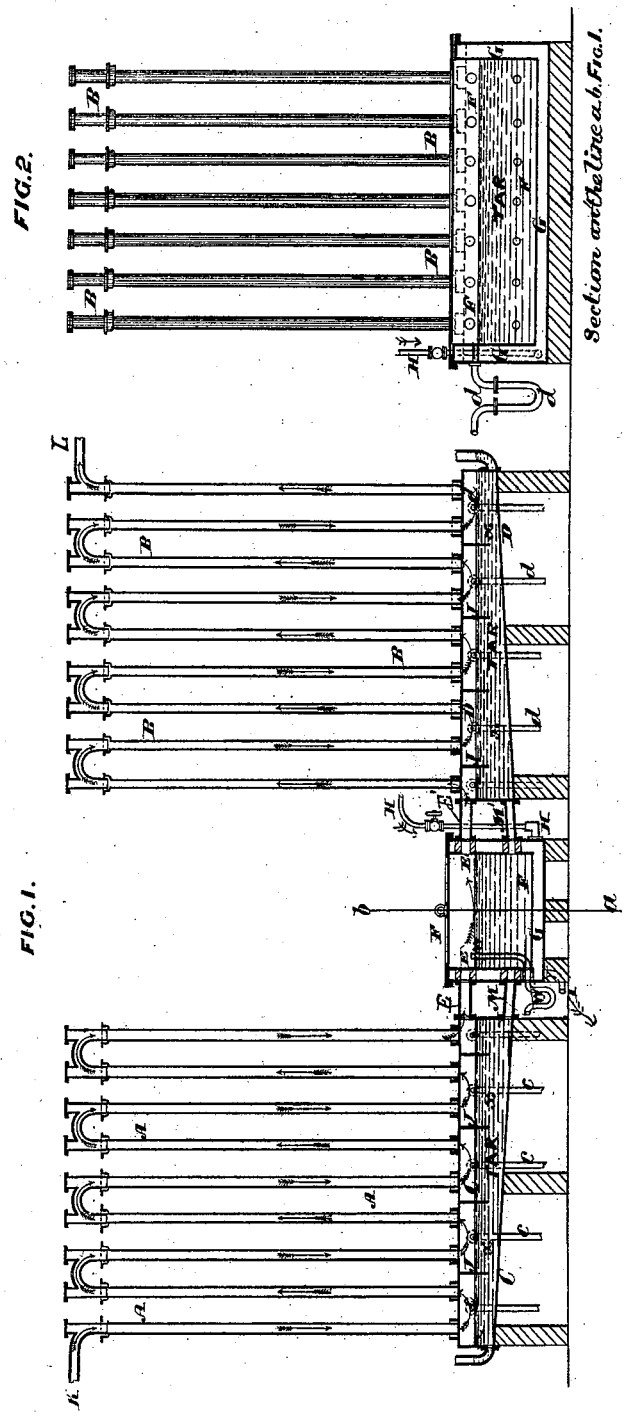

UNITED STATES PATENT OFFICE.

HENRY AITKEN, OF FALKIRK, NORTH BRITAIN.

IMPROVEMENT IN PROCESSES FOR MANUFACTURING ILLUMINATING-GAS.

Specification forming part of Letters Patent No. 197,712, dated December 4, 1877; application filed April 1, 1875; patented in England July 24, 1874.

*To all whom it may concern:*

Be it known that I, HENRY AITKEN, of Falkirk, in the county of Stirling, North Britain, coalmaster, have invented Improvements in the Manufacture of Illuminating-Gas, and in the apparatus or means employed therefor, of which the following is a specification:

This invention relates to improvements in the manufacture of illuminating-gas, and by which the illuminating power of the gas obtained by the destructive distillation of coal and other substances is enhanced. This object is effected by improved methods or means of treating the crude gases evolved in the process of manufacture, whereby the gases, as they are produced, are enabled to retain or to become saturated with the volatile hydrocarbon vapors and rich gases, which, by the ordinary methods of making illuminating-gas, are absorbed by, or carried off in, the tar and aqueous vapors.

By the present invention the injurious action both of the tar and aqueous vapors is prevented.

It is known to gas-managers and others engaged in the manufacture of illuminating-gas that the condensable tars do not separate from the crude gases as soon as the temperatures fall below their boiling-points, but that they are carried forward mechanically suspended in the gases, and hence one of the uses of the scrubber to rub out the mechanically-suspended matters after the gases have been cooled by the condensers. It is also well known that illuminating-gas is principally indebted for its illuminating power to volatile hydrocarbon vapors diffused through it, and that similar vapors are abundantly contained in the tars.

I have found that the treatment of the crude gases at present practiced is wasteful, and greatly deteriorates the illuminating power of the gas, for by the present treatment the cooled heavy tars mechanically carried forward and brought into contact with the cooled gases have the property of absorbing the very volatile hydrocarbons, which, if allowed to remain in the gases, would have much improved their illuminating power. I have further found that the presence of aqueous vapor in gases prevents them from absorbing and from retaining hydrocarbon vapors, and that gases in the presence of aqueous vapor deposit much of their light-giving constituents. I have also found that by depriving gases of aqueous vapor, in the manner hereinafter described, they have the power of retaining and absorbing hydrocarbon vapors to a greater extent, and so increasing the illuminating power of the gases beyond what is obtained under the existing practice. I have further found that by slowly cooling the gases and keeping the tars at a temperature of 190° Fahrenheit, or thereabout, in the manner hereinafter described, the said tars are prevented from absorbing from the gas those hydrocarbons which they carry off under the existing method of manufacture in which the tars are kept in contact with the gases at a lower temperature, such as that of the atmosphere.

My invention, then, has for its object the prevention of the injurious action hereinbefore mentioned of those tars on the crude gases, and also the improving of the illuminating power of the gases by removing the aqueous vapors, and so preventing the deposition of hydrocarbons, thereby enabling the gases to absorb and retain the hydrocarbons.

My said invention is capable of being practiced in various ways and with several forms or arrangements of apparatus, without the process of manufacture being made to vary substantially from that which is hereinafter described; and, in order that it may be fully understood, I have hereunto appended five sheets of drawings, showing some of the forms or arrangements of apparatus which may be conveniently used, and from which it will be easily seen how such form and arrangement may be varied so long as certain features, which are essential to the successful use of my invention, are included therein, as hereinafter set forth.

Figure 1, Sheet 1, of the annexed drawings is a front elevation, partly in section, of the first mode of carrying out my said invention. Fig. 2 is an elevation of the same at the end marked A, Fig. 1.

The retorts B, wherein the destructive distillation of coal or other substances is carried on, are fired in the ordinary manner from the grates C. Breech-pipes E connect the retorts B with a hydraulic main, D. An overflow branch, F, is attached to one end of the said main, and the said branch F is placed in communication with a pipe, G, leading to a tar-chest, H. The hydraulic main D is also placed in communication with a large cylindrical or other shaped vessel, I, by means of a pipe, J. The vessel I is supported in an inclined position upon piers K, and at its higher end is provided with an outlet-pipe, L.

When in operation the crude gases rising from the retorts B through the breech-pipes E enter the hydraulic main D in the ordinary manner; thence they pass through the pipe J into the vessel I, where they are partially condensed, and wherein they deposit their impurities with the tars. The vessel I being set in an inclined position, the tars thus deposited naturally flow toward the lower end, whereat the gases are admitted, and the upward current of gases from the hydraulic main D, meeting and coming in contact with the said tar, by virtue of their higher temperature, revolatilize and separate therefrom those hydrocarbons and other rich gases which have been absorbed by or deposited with the tar in the vessel I. The tar may either be allowed to run into the hydraulic main D through the pipe J, (to be thereafter removed therefrom by the pipe G to the tar-chest H,) or a separate pipe may be provided for the removal of the tar at the lower end of the vessel I. The gases thus cooled and saturated with hydrocarbons and other rich gases extracted from the tar, in the manner hereinbefore described, are afterward removed to purifiers through the outlet-pipe L.

By a modification of my invention the hydraulic main D may be increased in size, and the temperature of the gases kept at about 190° Fahrenheit. In this case the tars are taken therefrom by a different pipe to that which carries off the gases, and the vessel I is dispensed with.

Figs. 1 and 2, Sheet 2, show a second arrangement for revolatilizing the useful gases absorbed by or suspended in the tar-deposit, Fig. 1 being a vertical section of the arrangement, and Fig. 2 a section of Fig. 1 at the line $a\,b$, Fig. 1. Under this method of operating my invention I employ two sets of condenser-tubes, A and B, which are placed in communication with the chambers C D. Between the said chambers C D, and connected therewith by pipes or passages E E' and M M', is situated another chamber, F, surrounding which is a steam-jacket, G, whereinto steam is admitted by the pipe H, and allowed to pass off by the outlet-pipe I, or, in lieu of steam, any other convenient means may be adopted, whereby heat is imparted to the chamber or tar-chest F.

Overflow-pipes $c\,d$ are placed on the chambers C D; and, in order to insure the circulation of the current of gas through the apparatus, the said chambers are provided with divisions J at the upper part thereof, the divisions J dipping into the water and tar X contained in the chambers C D. In operating with this arrangement of apparatus the gases are admitted in the direction of the arrows to the first range of condenser-tubes A through the pipes K, the said gases being taken either direct from the hydraulic main, in connection with the retorts, or from the condenser, hereinbefore described with reference to Figs. 1 and 2, Sheet 1. In passing through the condenser-tubes A and chambers C, as shown by the arrows at Fig. 1, the gases deposit their tars, which sink in the chamber C, and, flowing down the inclined lower portion thereof, enter the tar chest or chamber F through the pipes or passages M, where they are superheated by the steam blown into the steam-jacket G from the pipe H. When the gases have traversed the whole set of condenser-tubes A they enter the tar-chest F by the pipes or passages E, and pass over the heated tar contained therein. In their passage through the tar-chest F the gases reabsorb and become saturated with the hydrocarbon and other useful gases given off by the tar in its superheated state. The gases, thus saturated and enriched by the hydrocarbon and other vapors given off from the heated tar, pass off from the tar-chest F by the pipes or passages E', and thereafter move, in the direction of the arrows, through the second set of condenser-tubes B and chambers D. The chamber D should, as nearly as possible, contain tar alone. The gases, in thus passing through the tubes B, deposit such portion of the hydrocarbon vapors as they are unable to retain, and finally escape out of the apparatus by the outlet-pipes L. The tar deposited in the chamber D flows into the tar-chest F through the passages M'. The tar-chest F is provided at one side with an overflow-pipe, $w$, arranged as shown on the drawings, by which the tar is run off continuously. The water is run off from the chambers C and D by self-acting inverted siphons $c$ and $d$, which are placed at such a level that the water cannot pass into the tar-chest F.

Fig 1, Sheet 3, of the annexed drawings is a vertical section of a combined condenser and filter or scrubber. Fig. 2 is a section of Fig. 1 at the line $a\,b$, Fig. 1.

As shown on the drawings, this apparatus consists of a series of boxes (two only, A and B, being shown) connected by pipe C and supported in an inclined position upon masonry D. The boxes A and B are partitioned into chambers by screens or filters E, which screens or filters may consist, as shown applied to the box marked A, of perforated sheets of metal or of wire-gauze, set in a frame and at a short distance apart, the intervening space being filled with broken coke, charcoal, stones, or other suitable filtering material; or they may consist (as shown at the box B, Fig. 1,) of perforated sheets of metal or wire-gauze G alone; or, otherwise, such screens or filters may be composed of a number of short pipes or passages, of small bore, arranged closely together; or, in place of the hereinbefore-recited modifications of screen or filter, a scrubber may be employed, consisting of a revolving frame, having its axis at right angles to the direction of the gas-current, and its periphery covered with perforated metal sheets or wire-gauze, which revolves among the tar and water, and through which the gases are passed, and thus washed, filtered, and purified. In operating the apparatus shown on the drawings at Figs. 1 and 2, Sheet 3, the crude gases are admitted to the first chamber in the box A through the inlet-pipe H, where they are partially cooled or condensed, and thereafter pass through the first filter or screen E, depositing in their passage the mechanically-suspended tars, which fall to the bottom of the box A and flow down the inclined plane formed by the bottom thereof. Having passed through the first filter or screen E, the gases are further cooled in the second chamber of the box A, after which they pass through the second filter or screen E, by which the suspended tars collected by the second cooling operation are removed.

The gases may thus be passed through any number of cooling-chambers and screens or filters, until the temperature is reduced to that of the atmosphere. The tars thus deposited in the boxes A and B flow beneath the screens or filters E G toward the lower end of the boxes; and as the temperature decreases in the passage of the gases through the several chambers and filters, it follows that the tars separated by each filter are removed at temperatures under which they do not absorb the hydrocarbons from the gases contained in the several chambers.

Pipes I, by which the tars may be drawn off from the boxes A and B, are connected to the lower ends thereof, the overflow from the boxes A and B being conducted by the inlet-pipe H to the siphon-pipe $h$.

The object of the hereinbefore-described arrangement is to remove the heavy tars from the gases before the temperature is sufficiently reduced to allow the volatile vapors suspended or diffused through the gases to be absorbed by the tars.

Another arrangement of condenser is illustrated at Figs. 1 and 2, Sheet 4, Fig. 1 being partly a front elevation and partly a longitudinal section, while Fig. 2 is a vertical section of Fig. 1 at the line $a\ b$, Fig. 1.

The object of this arrangement is again to cause the tars to become deposited at such a high temperature as will prevent them from absorbing or retaining those hydrocarbons and other useful vapors which are usually carried off by the tars in ordinary gas-making operations. To effect this object I employ a large cylindrical or other shaped vessel, A, connected by a pipe or passage, B, to a hydraulic main, C. The vessel A is supported in an inclined position upon piers D, and a range or coil of steam-pipes, E, extends throughout the lower part of its interior. Steam is admitted to the steam-pipe E through the branch F, and allowed to escape by the pipe G; or, in lieu of steam, any other means of raising heat may be employed. The tar deposited in the chamber A may either be allowed to enter the tar-chest H through the pipe and cock I, or the cock on the pipe I may be shut, and the tar caused to flow into the hydraulic main C through the pipe and cock J. The hydraulic main may be discharged of its tar by opening the cock on the pipe K, and allowing the tar to run into the tar-chest L. When in operation the crude gases are admitted to the vessel A from the hydraulic main C, and are slowly cooled therein to a temperature of about 190° Fahrenheit, the steam-pipe E being employed to keep the temperature at the required degree. Having deposited their heavy tars at the necessary temperature in the vessel A, the gases are thereafter conducted to other condensers and purifiers through the pipe or passage M.

In lieu of using a large chamber, A, heated by steam or hot air, as hereinbefore described, or instead of using steam or hot-air pipes to heat the vessel or chamber A, it may be surrounded by a steam, water, or hot-air jacket, or it may be placed in a house sufficiently warm to impart the desired degree of temperature thereto.

The figures on Sheet 5 illustrate two modifications of the last-mentioned arrangement of condenser. Fig. 1 is an elevation, and Fig. 2 a vertical section, of a tower or chamber, A, the arrangement of which in part corresponds to an apparatus known by chemists as an "analyser," the interior of which is fitted at intervals with partitions or trays C and D. The partitions C are fixed close against and attached to the interior of the tower or chamber A, and are formed with a hole or passage, $c$, at the center. Caps P may be fitted over all or any number of the holes or passages $c$, and as these caps P dip into the tars collected on the partitions C the gases in passing upward are caused to pass through the tars, whereby they are better enabled to absorb the hydrocarbons and other useful gases contained therein. These partitions to which the caps P are applied are also provided with overflow-pipes Q, by which the surplus of tar is allowed to escape. The trays D, on the other hand, are supported on angle-irons or bearers E, extending across the chamber or tower A, and as the trays D are less in diameter than the interior diameter of the tower or chamber A, an open annular space, $d$, is left round the trays D. The tower or chamber A rests upon brick-work F, in the lower part of which a furnace, G, is situated, whereby heat is imparted to the chamber H. The smoke from the furnace G escapes by the smoke-pipe I. (Seen more particularly at Fig. 3, which is a section of Fig. 2, at the line $a\ b$.) The gases to be condensed are introduced into the chamber H through the pipe J, and after passing upward through the tower A in the manner indicated by the arrows, they leave the tower A by the outlet-pipe K. In their passage the gases deposit their tars upon the trays or partitions C and D, and the more volatile portions of the tars are revolatilized by the ascending current of gases, by which they are carried off. The heavy tars deposited in the chamber H flow back into the pipe J, and are removed therefrom by means of the pipe M.

Fig. 4, Sheet 5, illustrates a nearly similar construction of condenser, except that perforated divisions E are placed between the hereinbefore-described partitions or trays C and D, a plan of one of these perforated divisions being shown at Fig. 5, Sheet 5. These perforated divisions may or may not be covered with coke, stone, or other material, and they are shown so covered in Fig. 4, Sheet 5. Also, instead of heating the chamber H by a furnace, as hereinbefore described with reference to Figs. 1, 2, and 3, Sheet 5, the lower part of the tower or chamber A, Fig. 4, constitutes a steam-chest into which steam is introduced through the pipe N.

By means of the apparatus shown on Sheet 5 of the drawings, tars of successively lower temperatures are deposited in the several trays in an ascending series, and as the gases become lowered in temperature as they ascend through the apparatus they necessarily deposit the heavier and absorb the lighter tars. After escaping from the pipe K the gases are taken to other condensers, where they are lowered to the atmospheric temperature, and when these further condensers are placed at a lower level than that which will admit of the tars being run back through the pipe K they are pumped up into the apparatus through the pipe O.

In treating the gases in the manner hereinbefore described it sometimes happens that an excess of sulphur compounds is carried off with the gas. It is desirable to remove these sulphur compounds, and this may be conveniently accomplished by washing the gases with the ammoniacal liquor produced in this process, previously cooled to a temperature of about 70° Fahrenheit, in the manner ordinarily employed in gas-works; or these sulphur compounds may be got rid of by any of the processes now in use and well understood.

In operating with the several forms or arrangements of apparatus hereinbefore described and shown on the annexed drawings, gas-exhausters may be used to assist the passage of the gases in or through the apparatus.

The trays E may be made so as to project alternately about three-fourths across the tower; or the tower may be filled entirely with stones, coke, or other materials of suitable size.

In all the foregoing arrangements the great point to be arrived at is to prevent the gases and tars coming together at a temperature at which the tar will absorb the rich hydrocarbons, and although this point will vary with different classes of material, which will be easily ascertained by experience, I have found that very good results are arrived at by not allowing the temperature to fall below 190° Fahrenheit.

Another part of my said invention relates to a treatment whereby gases are enabled to retain permanently hydrocarbon vapors suspended therein. To effect this, I remove the aqueous vapors from the gases by causing them to pass over or through dry caustic lime, or other absorbent of aqueous vapor. These absorbents may be placed in a chamber on trays or pipes, or otherwise arranged so as to expose a large absorbing-surface to the gases, which may be thus treated before or after they leave the purifiers; or these gases so dried may be further enriched by passing them over or through tars or oils rich in volatile hydrocarbons heated to a temperature of about 190° Fahrenheit.

To prevent the gases, during their subsequent storage and distribution, from reabsorbing aqueous vapors, I cover the surface of the water in the tank containing the gas-holder with a layer or film of tar or oil, saturated with paraffine, or other like spirit; but I prefer to use commercial "intermediate paraffine oil," saturated with paraffine spirit, or other light spirit, so as to prevent the water from absorbing hydrocarbons from the gases. The saturated oil or tar, or preferably intermediate paraffine oil, may also be used with advantage in wet meters, as, besides being a non-absorbent of hydrocarbon vapors, it is not subject to evaporation at ordinary temperatures, and thus a constant liquid-level is obtained, and correct measurement of consumption effected.

I claim—

1. The process of treating the gases obtained by the destructive distillation of coal and other substances, substantially in the manner and by the means herein described, so that they are maintained at a warm temperature, whereby they are either prevented from depositing the volatile hydrocarbons and rich gases in the tars, or by revolatilizing the said hydrocarbons and rich gases which have been absorbed in the tars, so that these gases become saturated therewith and their illuminating power is improved, as hereinbefore set forth.

2. The process of removing aqueous vapors from gases, and thereafter passing the gases in or through volatile hydrocarbons, thereby increasing their illuminating power, substantially as hereinbefore described.

In testimony whereof I have signed my name to this specification in the presence of two subscribing witnesses.

HENRY AITKEN. [L. S.]

Witnesses:
DAVID DRYSDALE AUSTEN,
GEORGE MACAULAY CRUIKSHANK.